United States Patent Office 3,490,828
Patented Jan. 20, 1970

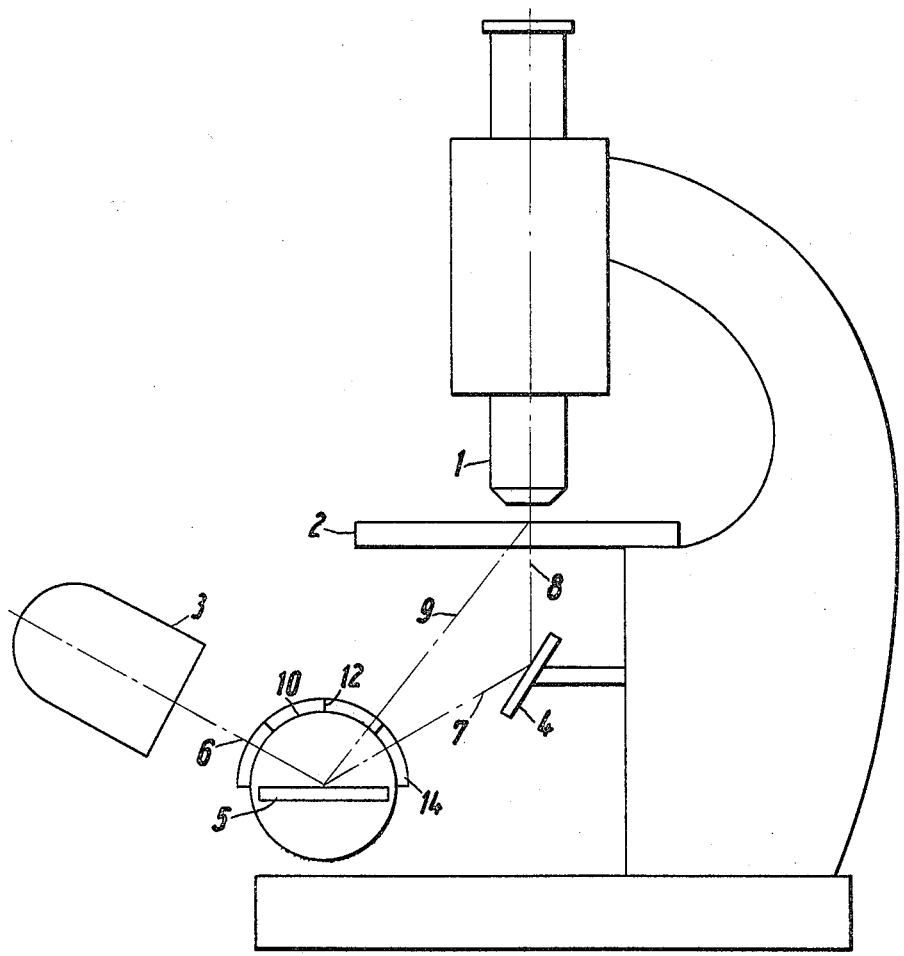

3,490,828
MICROSCOPE WITH MEANS FOR VARYING THE DIRECTION OF LIGHT TO THE OBJECT TO BE VIEWED
Eberhard Rehm, Dietmannsried, Germany, assignor to Hertel & Reuss Werk fur Optik und Feinmechanik, Kassel, Germany
Filed Apr. 24, 1967, Ser. No. 633,260
Claims priority, application Germany, Apr. 28, 1968, H 59,242
Int. Cl. G02b 21/06
U.S. Cl. 350—87
1 Claim

ABSTRACT OF THE DISCLOSURE

The microscope includes a light source for directing light onto a stationary mirror for reflection substantially vertically upwardly through the material on the slide and a movable mirror is mounted in the path of the light on a carrier so that it may be oriented at a selected angle for by passing the stationary mirror and varying the incidence light to the object.

DESCRIPTION OF THE PRIOR ART

This invention relates in general to microscopes and in particular to a new and useful microscope having means for providing a side illumination for the object to be viewed.

In order to illuminate objects to be viewed in a microscope, the known mircroscopes make use of a light source or a mirror whose light is directed toward the object in the direction of the optical axis of the microscope from below. In other embodiments a condenser is provided for dark field illumination. The condenser permits light to reach the object from all sides, however, and not only in the direction of the optical axis.

It has been found that if an object to be viewed in the microscope is illuminated from one side only in an oblique manner from below and under an angle of about from 135° to 155°, contrasts of the object can be clearly recognized. This is particularly true in respect to samples of bacteria, which contrasts until now could only be ascertained by means of cumbersome dyeing methods.

SUMMARY OF THE INVENTION

Accordingly, it is an object of the invention to provide a microscope having a light source arranged to direct light onto a movable mirror which may be oriented so that at least a portion of the light is reflected toward the object being viewed in an oblique manner to provide for a one-sided illumination from below.

A further object of the invention is to provide a microscope having an illumination system which includes a fixed mirror arranged in spaced relationship to a light source below the specimen table over which the objective is mounted and including a mirror pivotally mounted on a carrier such that it may be oriented along the axis of the light source in order to reflect the light either to the fixed mirror or directly to the specimen being viewed an an oblique side lighting.

A further object of the invention is to provide a microscope which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWINGS

The only drawing in the case is a schematic side elevational view of a microscope constructed in accordance with the invention.

GENERAL DESCRIPTION

Referring to the drawing in particular, the invention embodied therein comprises a microscope having an objective 1 which is located directly above a table or viewing stage 2 upon which the object to be viewed is placed. A light source is constituted by a lamp 3, and the central axis of the light rays indicated, at 6, is reflected by a mirror 5 as a light ray 7 which is reflected by the customary mirror 4 substantially vertically upwardly as a light ray 8 and through the object to be viewed.

In accordance with the invention, the mirror 5 is mounted on a carrier 10 which is rotatable and visual indications 12 are provided on a dial 14 for indicating the amount of rotation from a fixed index point in order to read the angle at which a reflected ray 9 is directed obliquely through the transparent specimen slide 2. The light ray 9 is passed directly from the mirror 5 obliquely in respect to the object so that a desired one sided illumination of the object takes place.

The carrier 10 is located such that the mirror 5 may be oriented to reflect the light as a light ray 7 onto the stationary mirror 4 for further reflection as a light ray 8 or the mirror may be positioned to reflect the light as a ray 9 which is directed toward the object obliquely from one side in accordance with the setting of the carrier as indicated by the indications 12 on dial 14.

While a specific embodiment of the invention has been shown and described in detail to illustrate the application of the inventive principles, it will be understood that the invention may be embodied otherwise without departing from such principles.

What is claimed is:
1. A microscope comprising a stage for supporting an object to be viewed, microscope viewing means including an objective disposed above said stage with its axis substantially perpendicular to said stage, a stationary mirror disposed below said stage and including a surface arranged along the axis of the microscope, a light source alongside said stationary mirror and below said stage, and optically aligned therewith, a movable mirror disposed in the light path between said light source and said stationary mirror, means pivotally mounting said movable mirror below and to one side of said stage, for pivoting about an axis substantially parallel to said stage and parallel to said stationary mirror, in a position so that in selected first pivotal orientations it will direct light directly from said light source obliquely upwardly at an angle of from 135° to 155° through the object to be viewed and from one side thereof, in by-passing relation to said stationary mirror, and in another second piv- otal orientation it will direct light from said light source to said stationary mirror for reflection by the latter upwardly through said stage and the object to be viewed; said mounting means for said movable mirror comprising a carrier having a pivotal part carrying said mirror and rotatable to change the angle of incidence of light from the light source and the angle of reflection of said light in accordance with the illumination of the object which is desired.

References Cited

UNITED STATES PATENTS

| | | | |
|---|---|---|---|
| 198,782 | 1/1878 | Tolles. | |
| 2,146,506 | 2/1939 | Maisch | 350—87 |
| 1,761,260 | 6/1930 | Gallasch | 350—87 |

DAVID SCHONBERG, Primary Examiner

PAUL R. GILLIAM, Assistant Examiner